(12) United States Patent
Goodson

(10) Patent No.: US 6,783,799 B1
(45) Date of Patent: Aug. 31, 2004

(54) SPRAYABLE PHOSPHATE CEMENTITIOUS COATINGS AND A METHOD AND APPARATUS FOR THE PRODUCTION THEREOF

(76) Inventor: David M. Goodson, 313 W. Fourth St., Hinsdale, IL (US) 60521

( * ) Notice: Subject to any disclaimer, the term of this patent is extended or adjusted under 35 U.S.C. 154(b) by 0 days.

(21) Appl. No.: 10/446,743

(22) Filed: May 28, 2003

Related U.S. Application Data

(60) Division of application No. 09/906,933, filed on Jul. 17, 2001, now abandoned, which is a continuation-in-part of application No. 09/631,445, filed on Aug. 2, 2000, now Pat. No. 6,458,423.
(60) Provisional application No. 60/146,912, filed on Aug. 3, 1999.

(51) Int. Cl.$^7$ .............................. B05D 1/02; B05D 1/36; B05D 3/02
(52) U.S. Cl. ....................... 427/140; 427/402; 427/458; 427/136; 427/314; 427/376.1; 427/403; 427/421; 427/422; 427/426; 427/427
(58) Field of Search ................................. 427/402, 140, 427/458, 136, 314, 376.1, 403, 421, 422, 426, 427

(56) References Cited

U.S. PATENT DOCUMENTS

| | | | | |
|---|---|---|---|---|
| 4,721,659 A | * | 1/1988 | Tieckelmann et al. | 428/701 |
| 5,695,811 A | * | 12/1997 | Andersen et al. | 427/133 |
| 5,988,300 A | * | 11/1999 | Pomerleau et al. | 175/320 |
| 6,220,782 B1 | * | 4/2001 | Yates | 404/75 |
| 6,458,423 B1 | * | 10/2002 | Goodson | 427/403 |

* cited by examiner

*Primary Examiner*—Michael Barr
(74) *Attorney, Agent, or Firm*—Bingham McHale LLP; C. John Brannon

(57) ABSTRACT

A sprayed-on phosphate cement coating formed from the combination and reaction of a phosphoric acid solution and a base metal solution. The acid solution and base solution may be intermixed prior to spraying, during spraying, or on a substrate. The curing reaction rate of the phosphate cement coating and its final physical properties may be controlled by adding various retardants, accelerants, reducers, wetting agents, superplasticizers, buffers, water reducers, adhesive agents, hardening agents, and/or sequestrants to the precursor solutions. The curing rate and properties of the cement coating may be further controlled by adjusting the temperature of the precursor solutions and/or the target substrate.

31 Claims, 3 Drawing Sheets

SPRAYABLE PHOSPHATE CEMENTITIOUS COATINGS AND A METHOD AND APPARATUS FOR THE PRODUCTION THEREOF

CROSS-REFERENCE TO RELATED APPLICATIONS

This application is a divisional of U.S. patent application Ser. No. 09/906,933, filed Jul. 17, 2001 now abandon, which is a continuation-in-part of U.S. patent application Ser. No. 09/631,445 filed Aug. 2, 2000 now U.S. Pat. No. 6,458,423 and claims priority to U.S. Provisional Application Ser. No. 60/146,912 filed Aug. 3, 1999.

TECHNICAL FIELD OF THE INVENTION

The present invention relates generally to ceramic materials and, more particularly, to sprayable phosphate cement coatings and a novel method and apparatus for producing them.

BACKGROUND OF THE INVENTION

Ceramic cements are mixtures of water and reactive metal oxides that harden and fasten upon setting. Cements have a variety of familiar uses, such as the adhesive component to concrete (essentially an agglomeration of rocks held together by cement), the bonding layer that holds bricks together to form walls, as structural building materials such as patio or garage slabs. The cement of choice for most of these familiar uses is Portland cement, a mixture of water and calcined lime and silica. Upon curing, the primary constituents of Portland cement are dicalcium silicate and tri-calcium silicate phases. Portland cement has the advantage of being cheap to produce and relatively easy to mix and pour. Part of the reason Portland cement is so cheap is because the silica component may come from a wide variety of sources, usually silica-containing clays, and also because these clays do not have to be especially pure or consistent.

Portland cement also suffers from some disadvantages, inconsistency of physical properties arising from the inherent inconsistency of the source materials (both in composition and quality) being chief among them. Portland cements also have the disadvantage of having a relatively high viscosity. While they are well adapted to pouring and spreading, Portland cements are not well suited for pumping and spraying. Moreover, Portland cements are characterized by a relatively slow curing time. Another disadvantage of Portland cement is that it does not bond well to itself, especially if the existing cement surface is already hardened. Portland cement-containing structures, such as cement driveways or road segments, must be formed in essentially one step. If there is an interruption in the forming of a Portland cement body sufficient to allow the cement to begin to cure, a structural discontinuity or "cold joint" can result. Moreover, Portland cement cannot be used to patch a Portland cement structure absent costly and time consuming surface pre-treatment at the patch interface, for example sawing out the old rebar and damaged concrete, drilling holes for new rebar, placing the new rebar in the holes, and pouring and finishing the new concrete.

While Portland cement is usually applied by pouring from a mixer and Portland cement mortar is spread from a palette, Portland cement can also be sprayed. Sprayed Portland cement, or "shotcrete", is applied as a thick, rough layer of cement only in industrial applications that do not necessitate even or controlled coating, such as "shotcreting" over wire mesh for producing the foundations of swimming pools and for walls of tunnels and mines. Shotcrete is applied in very thick rough coats through enormous and expensive pneumatic sprayers and pumps that are not suited for smaller scale applications. Shotcrete sprayers cannot produce thin coatings or smooth finishes, and shotcreted surfaces sacrifice aesthetics for functionality. Often, half of the shotcreted Portland cement is lost to "rebound". The rebounded Portland cement becomes widely scattered, cannot be reused, and contributes to waste products that require time and effort to clean up. Portland cements set up and harden very slowly and are fairly porous, especially to road salt, which can degrade and rust steel reinforcement members in the concrete, causing expansion of the reinforcement members and the eventual rupture of the cement from within.

Another kind of cement is phosphate cement. Phosphate cements undergo an acid-base reaction during curing. Typically, the acid component is either phosphoric acid (usually in liquid form) or an alkali-earth phosphate salt such as magnesium phosphate, calcium phosphate or ammonium phosphate. The base component is typically highly calcined magnesium oxide, one supplier of which is Martin Marietta Magnesia Specialties of Baltimore, Md. The compositions of the acid and base pair are chosen such that the resulting combination will react to form a cementitious metal-phosphate. The acid and base components when mixed rapidly cure to form a cementitious metal phosphate phase. The phosphate cement forms by a highly exothermic reaction and sets up rapidly, quickly agglomerating and increasing in viscosity.

Most phosphate cements have excellent strength and hardness characteristics, and have the additional advantage of adhering to most other materials, including cement (both phosphate and Portland), brick, metal, wood, most wood products, insulation, asphalt, roofing materials, membranes and some glasses. Phosphate cements also have excellent chemical stability and compressive strength, and have toughness characteristics superior to those of Portland cement. Moreover, phosphate cements tend to set up with little or no open porosity and therefore can be used to form waterproof forms and seals. Phosphate cements, like most ceramics, are fireproof and resistance to very high and tend to be electrically nonconductive and are good thermal and acoustic insulators.

Traditionally, phosphate cements have been used almost exclusively for dental and biological applications, road patching, and specialized refractory applications. This is because phosphate cements are roughly an order of magnitude more expensive than Portland cement and cannot be used in bulk because the highly exothermic nature of the phosphate reaction causes phosphate cements to set up rapidly and to agglomerate, while generating a lot of heat. Unlike in Portland cement, where the heat of hydration evolves slowly and plateaus, the heat of hydration of phosphate cements spikes quickly, with great heat evolution occurring promptly after the cement is mixed. This results in the phosphate cement setting up too quickly (and exothermically generating too much heat) to be workable for anything except road patching, thus rendering phosphate cement undesirable for mass pours.

There are a variety of coating applications (fireproofing, water and fluid sealants, electrical insulation foam, electrical insulation coatings, thermal insulation coatings, chemical insulation coatings, rust proofing, overcoating existing roofs, walls, drywall, siding, floors, basements, roads and the like) that could be addressed by a thin or thick ceramic coating of a material having the properties of phosphate cement, but currently the technology does not exist to commercially apply thin cement coatings and, more particularly, to spray phosphate cements coatings. While the superior properties of phosphate cements would make them desirable for a much wider range of applications, their reactivity makes them ill-suited for bulk mixing, dipping, brushing, rolling and spraying since they tend to thicken and agglomerate quickly, rapidly clogging and packing spray nozzles, needle valves, hoses, and containers. This makes phosphate cements impractical for spraying, especially since most commercial spray apparati have orifices and conduits too small to accommodate the flow of a liquid having the density and viscosity of a phosphate cement. Further, most commercial spray apparati are expensive, and would be ruined by phosphate cements (especially those containing aggregates) setting up in the sprayer hoses, nozzles, and containers, thus making, their usage with phosphate cements impractical. Moreover, since ejecting the phosphate cement is the primary method of dissipating the excess waste heat generated by the acid-base reaction, a clogged spray line or nozzle can contribute to the overheating of the sprayer system, therefore increasing the hazard of fire or an explosion of the closed container. Further, overheating of the cement mixture in the sprayer also increases the reaction rate, thereby evolving even more heat and potentially causing further agglomeration in the spray gun and hoses resulting in a catastrophic runaway reaction.

There are currently no known mineral cements capable of being applied as a thin, sprayed on coating or layer. There are also currently no known phosphate cement compositions that may be applied to a substrate by conventional spraying, coating, dipping or brushing techniques. There is therefore a need for a phosphate cement material with a controllably slow reaction and curing rate that can be mixed in bulk with a stable, low viscosity suitable for application as a thin coating via sprayer or via conventional application techniques. The present invention addresses this need.

SUMMARY OF THE INVENTION

One form of the present invention relates to a phosphate cement composition with a sufficiently controlled reaction rate that the phosphate cement may be mixed in bulk and with suitable viscosity to be sprayed or used for mass pours. Another form of the present invention relates to a method and apparatus for mixing and spray applying a phosphate cement composition.

One object of the present invention is to provide an improved cement. Related objects and advantages will be apparent from the following description.

DETAILED DESCRIPTION OF THE PREFERRED EMBODIMENT

Figure 1:
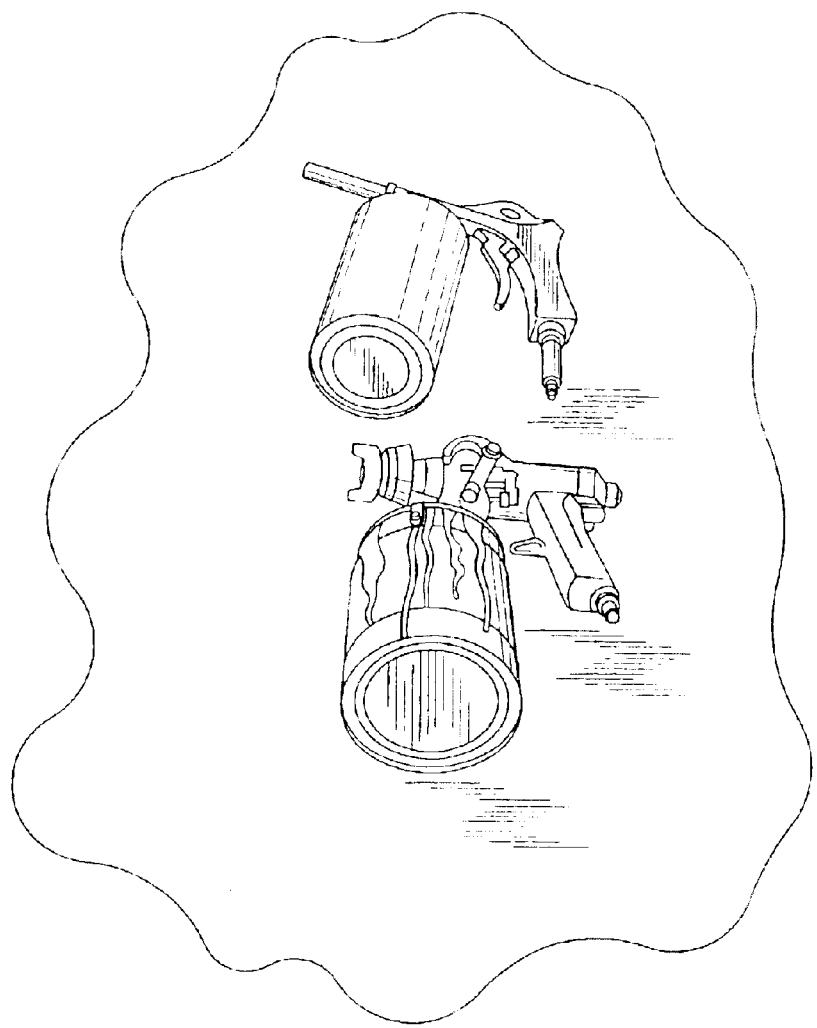
FIG. 1 is a perspective view of a commercial embodiment of a prior art spray gun apparatus.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

General Composition and Criteria for Maintaining Sprayability

The present invention relates to a sprayable phosphate cement material with a controlled curing reaction time and viscosity. The cement composition includes a phosphoric acid component, a metallic alkali or base component, and water. The phosphoric acid component and the metallic base component are mixed with water separately to form component slurries (i.e., an acid slurry and a base slurry), and each slurry is maintained separately until the application step. The application step preferentially involves first coating a desired surface with the phosphoric acid mixture and then with the metallic base slurry. Alternately, the application step may involve first coating the desired surface with the base slurry and then the phosphoric acid solution, or simultaneously spraying the desired surface with the both the phosphoric acid solution and the base slurry from separate sources, wherein the acid and base components mix in transit or in situ on the desired surface.

Preferentially water, metallic base and one or more retardants, emulsifiers, deflocculents, sequestrants and/or dispersants are added to cold water and mixed in with the silica source(s) and other aggregates and fillers and colorants to form a slurry. Next, the liquid phosphoric acid or phosphate salts are quickly mixed into the slurry, and the slurry is then preferably immediately sprayed onto a desired target, although the use of cold precursors and strong retarders can extend the shelf-life, pot life and working time of the mixed phosphate cement slurry such that immediate spraying is not a requirement. Alternately, with the use of strong retardant additives, dry powder phosphate salts, silica sources, and metallic oxide alkali powders can be mixed together to form a slurry having a long enough pot-life to make spraying possible.

After the phosphoric acid and/or the phosphoric salt(s) and the metallic base components are mixed, the phosphate cement slurry is preferably used promptly. The individual cement components may be mixed in spray cans or any clean containers and mixed right on the job, preferably in a cool environment. Preferably, the water used in the mixture is added cold in order to retard the progression of the exothermic acid-base phosphate cement-forming reaction.

Alternately, the phosphoric acid and/or the base coat may be brushed, troweled or squeeged on, with the other coat also either sprayed or brushed or troweled or squeeged on. One coat of the slurry with acid and base and silica sources is usually enough to provide good coverage, although subsequent coats are easy to apply and may be applied immediately after the first coat is applied. This material may also be rolled on.

In the preferred embodiment, the waterborne base coating is applied first. More preferably, the second, phosphoric acid coat contains a silica source admixed therein.

Alternatively, the base coating is applied secondly, preferably by spraying, such that it penetrates the existing phosphoric acid layer and allows the cementitious reaction to begin. The silica source, aggregates, flyash and fillers may be contained in either the first coat, second coat, or both. It should be noted that spraying is also a densifying technique, since during spraying much of the water is rebounded or misted out of the composite.

The reaction progresses rapidly since the reactants are spread as a thin coating over a large surface area with a brush, spray gun, caulking gun, roller, trowel or squeegee. Also, the heat generated by the reaction is dissipated quickly, again because the reaction occurs over a large area and is generated in a thinly spread film having a very high surface area to volume ratio. In one alternate embodiment, the base coat is applied first, followed by the phosphoric acid coat, thereby catalyzing the in-place base slurry.

Some preferred phosphoric acid components include calcium phosphate, potassium phosphate, magnesium phosphate, sodium phosphate, aluminum phosphate, ammonium phosphate, zinc phosphate and combinations thereof. By using controlled combinations of different phosphate salts, each one spiking in temperature at a different time, the overall temperature profile of the composition is controlled so as to substantially minimize the maximum temperature reached. Therefore, the controlled combination of the above-listed phosphate salts has the same effect as the addition of a temperature retarder, especially when the sizes of the phosphate salt precursors are varied and also when the sizes of the oxides are varied, as well as replacing in whole or in part the oxides and/or acid salts with slower reacting acids and bases and/or oxides of lower valences. For example, the reaction may be retarded by replacing about 1–80% of the calcined MgO with $Fe_2O_3$, KOH, $Al_2O_3$, calcined mullite, kyanite or zirconium oxides. Likewise, adding in or replacing some or all of the fast reacting ammonium, calcium, or magnesium phosphate salts with less active MKP (mono potassium phosphates) or polyphosphates or with di-potassium phosphate, di-calcium phosphate, di-ammonium phosphate and/or other alkali earth phosphates with higher pH values than MCP (mono calcium phosphate) or MKP or MAP(mono ammonium phosphate) or MMP (mono magnesium oxide), also phosphorous acid in whole or as a partial replacement for phosphoric acid or phosphate salts. In addition, the resultant mix of different shaped and size crystals can yield denser packing and gives a "granite effect" to a composition formed therefrom, whereby the composition has improved fracture strength as cracks cannot as easily propagate through a composition with no common cleavage lines.

The phosphoric acid component may be either a solid (preferably a powder) or a liquid. Some preferred metallic base components include magnesium oxide, dolomite, zinc oxide, aluminum oxide, calcium oxide, lithium carbonate, barium carbonate, barium sulfate, molybdenum oxide, calcium hydroxide, aluminum hydroxide, tin oxide, nickel oxide, nickel hydroxide, cobalt oxide, cobalt hydroxide, vanadium oxide, magnesium hydroxide, iron oxide, titanium oxide, chromium oxide, chromium hydroxide, dolomite, manganese oxide, zirconium oxide, zirconium hydroxide, NaOH, KOH, sodium carbonate, potassium carbonate, calcium feldspar, sodium feldspar, potassium feldspar, potash, caustic potash, lime, dolomitic lime, hydrated lime, finishing lime, air entrained lime, air entrained dolomitic lime, mason's lime, EZ Spread (available; from Rockwell Lime Company, Manitowoc, Wis.) and wood ash.

One means of controlling the reaction rate of the cement is by controlling the temperatures of the cement components. The colder one or both of the components are kept, the slower the reaction progresses. One way of controlling the temperature of the phosphoric acid component and the metallic base component is by cooling the water used in the admixture of each. Another means of temperature control is cooling one or both of the components' containers and/or the spraying apparatus, such is in an ice bath, by refrigeration or with dry ice. Another means of controlling the reaction rate is to keep the surface to be sprayed cold, such as with ice or cold water or dry ice. Various combinations of these cooling techniques may be employed to obtain maximum temperature control of the reaction.

The following cooling additives may be added to the phosphate cements to reduce the reaction temperature thereof: ammonium nitrate (preferably added either as a powder or in aqueous solution) or any other like chemical that reacts endothermically. Such additives allow the mass pouring of phosphate cement with less heat shrinkage, even in hot weather. Likewise, using potassium metal oxide ions, potassium hydroxide and/or potassium oxide or feldspars in lieu of ammonium or magnesium phosphate salts or phosphoric acid also reduces the heat of reaction. Similarly, the reaction heat may be reduced through the novel use of phosphorous acid in lieu of the phosphate salts of ammonia or magnesium or phosphoric acid. Cooling the phosphate cement reaction retards initial and final set and lowers the overall heat generation, reducing shrinkage and allowing more work time and pot life. Heat shrinkage in both phosphate and Portland cements is also significantly reduced by addition of CMC's, cellulosic materials, guar, aloe vera, saw dust, Berylex™ (made by Chemstone Products of San Jose, Calif.) and the like.

Another means of controlling the reaction rate is the use of the retarders (surfactants, retarders, dispersants, water reducers, super plasticizers, barium sulfate, air entrainers (such as Silipon™ and Desinate™ by Hercules of Wilmington Del.), cellulose, cmc's and sequestrants) in the cement-forming components. Preferably, the retarders are added to the water before it is added to the powdered phosphoric acid solution and/or the metallic base precursors (minerals, metal oxides, and the like) to form the base slurry. This approach provides that no water contacts the component materials (usually powders) without a dispersant/retarder present. Since cement-forming powders are reactive, the retarders slow the setting time by keeping them apart, eliminating or reducing rapid agglomeration and aiding to control the reaction of the cement. Alternately, the cementitious precursors and retarders may be prepared as a single dry mixture ready to use with the addition of water.

Another embodiment of the present invention contemplates pre-mixing the phosphoric acid solution and the metallic base slurry before spraying. In this embodiment, it becomes necessary to reduce the reaction rate of the cement sufficiently to keep the mixed cement slurry from becoming too viscous to remain sprayable as a thin coating. This is achieved through cooling the mixed solution, by using chilled water and/or refrigeration of the container and sprayer and/or through the use of retarders. As above, retarders are used to keep the component particles dispersed in order to slow the chemical reaction and prevent agglomerations from forming inside the sprayer. Additionally, either or both the acid and base components may be saturated in carriers such as sawdust, cellulose, cmc's, guar and the like to provide a mechanism through which they may slowly and controlledly enter the slurry. Another method for retarding curing is to put the slurry into the mixing vessel, spray gun, pump, or pressure pot and keeping it agitated, as these slurries tend to be thixotropic and agitation retards curing. Still another method of controlling the speed of the phosphate cement-forming reaction is through the use of pH buffers to regulate the pH of the solution and thereby its reaction rate. Yet another means of regulating the reaction rate is by controlling the concentration of the acid and base components or, conversely, the water component. Increasing the water concentration will slow the reaction rate of the cement. Traditionally phosphate cement manufacturers want a low water/cement ratio, as they believe that like Portland cement, the lower the w/c ratio the greater the compressive strength. Through the addition of more mix water, the crystals continue to grow/form as long as there is unreacted acid and base present, the extra water facilitating exchange of unreacted acid and base ions for continued hardening and pore filling. By keeping the size of the reactive particles small (such as by choosing to include fly ash and miconized silica) the reaction may be coaxed to nearly theoretical completion in reasonably short times. Small particle sizes also facilitates achieving nearly theoretical density through the filling of pores, which contributes to increased tensile, elastic, ductile, shear and compressive strengths.

It is preferred that the phosphate cement be mixed thoroughly. If an even stronger and less porous cement is desired, it is more preferred that a plastic resin and/or catalyst/initiator be admixed therein to yield a strong phosphate cement that is less porous and more water resistant. The additions of MMA (methyl methacrylate), EMA(ethyl methacrylate), BMA (butyl methyl methacrylate) and other epoxies, urethanes and plastics (especially moisture-cured plastics) can also yield harder or tougher cements. Moreover, the addition of an emulsifier helps to better disperse the above additives in the cementitious mixture, as do some water reducers (such as Darvon 2 from R.T. Vanderbilt of Norwalk, Conn.). Darvon 2 is especially attractive for this use, since it also acts as a dispersant and an emulsifier. Phosphate cements cure exothermically, generating substantial amounts of heat quickly. The heat generated by the curing phosphate cement likewise speeds the curing of endothermic plastics and plastic coatings, such as bunary epoxies, polyurethanes and moisture-cure resins. Additionally, the heat generated by the curing phosphate cements is often sufficient to raise the energy of a system containing an exothermically curing component enough to initiate the reaction (in other words, if the system includes a component that requires a predetermined energy influx in order to begin reacting, the heat spike produced by the curing phosphate cement usually exceeds the predetermined energy influx requirement). These phosphate cements are compatible with numerous catalysts, such as BPO, and will even mix with Bondo™ (available from Dynatron/Bondo Corp. of Atlanta, Ga.).

It is preferred that the sprayed surface first be cleaned in order to optimize the bonding of the reactive phosphate cement. It is not necessary to abrade or acid etch a surface in preparation for cement spraying, although a wash with phosphoric acid (or other acids such as TSP=tri sodium phosphate) or NaOH or KOH solutions does tend to enhance bonding. Attaching an electrical charge to the substrate or the substrate wetting solution along with an opposite charge imparted on the slurry being applied increases adhesion. Including a magnetic ingredient, such as iron oxide or the like, into the wetting solution on the substrate and/or into the slurry to be applied can also increase adhesion. This is useful for tuck pointing, in that is greatly reduces the labor in an otherwise labor intensive process, and makes it possible to use power mortar guns or caulking guns, instead of placing all mortar with very small hand trowels from small handheld palettes. Other cementitious or plastic based products for overlaying concrete require that the concrete surface first be cleaned and then either etched or abraded.

A smooth surface finish may be produced by limiting the size and/or amount of the aggregate component of the cement Also, the additions of diatomaceous earth and/or bentonite, Laponite™ (available from Southern Clay Products, Inc., Gonzales, Tex.), hectorites, smectites, montmorillonite, MetaMax™ (available from the Engelhard Corporation of Iselin, N.J.), air entrainers, defoamers, cmc's, ethyl methyl celluloses, ethyl hydroxyethyl celluloses, potash, feldspars, small micron or nanosized particles of ingredients, smaller less reactive aggregates, lower valence oxides. Barium sulphate, CMC's, ethyl hydroxyethyl cellulose, cellulose ethers, cellulose, methyl propyl cellulose, Culminol™ and Nexton™ (made by Hercules Incorporated's Aqualon Division in Wilmington, Del.), Bermocol™ (available from Akzo-Nobel, Sweden), sodium silicate, potassium silicate, fumed silica, colloidal silica, silica flour or the like may improve the surface finish without substantially diminishing the cement's strength or chemical stability. The aforementioned clays and diatomaceous earth and combinations thereof and barium sulfate retard the initial setting or curing of the phosphate cement, as well as enhancing the flowability and workability of the cement (i.e., producing a cement that is self-leveling and self-consolidating). Diatomaceous earth and/or bentonite additions (preferably at levels of about 0.1 to 4%) may be thoroughly mixed into the cement precursor to achieve the result of reducing the number and size of surface pores. Gums, air entrainers, clays, round aggregate, small aggregate, super plasticizers, wetting agents, Kelco-Crete™ (available from Astaris LLC of St. Louis Mo.), Berylex™, guar, and the treated cellulosic materials named herein such as cmc's arc rheology modifiers and assist in reducing sag, and making portland and phosphate cements self-leveling and self-consolidating. Likewise, the surface finish may be controlled by the additions of dispersants and/or sequestrants that control the distribution of the aggregates in the mix. Pre-coating the acid and base and reactive aggregates with water reducers and/or slow dissolving non-reactant coatings and/or mixing either the base or acid portion in last, tend to reduce agglomeration, increase pot life and initial set times.

Some Preferred Phosphate Cement Compositions

In one preferred embodiment; the phosphate cement composition is comprised of a non-aqueous portion and an aqueous portion. The non-aqueous portion comprises about 85% silica or other aggregate and about 15% cement paste (by wt.); wherein the cement paste consists of an acid component, a base component, and additives (mostly dispersants and retarders). One preferred retarder additive is the commercial preparation Dequest 2000™ (a dispersant and sequestrant in one). The base component includes calcined MgO, and the acid component includes equal amounts of mono potassium phosphate (MKP) and mono magnesium phosphate (MMP) and mono calcium phosphate (MCP) or tri-calcium phosphate (TCP) salts. The aqueous portion is at least about 20% by weight of the cement paste. The silica/aggregate component is preferably about 13% silica flour, abut 80% class "C" or class "F" fly ash or micron or sub-micron sized silicas, about 7% sodium and/or potassium silicate and/or colloidal silica and/or fumed silica and/or silica fume and/or anhydrous silica. Using the Schutz automotive undercoating spray gun (available from the 3M company of St. Paul, Minn.) or another medium-to-large orifice gun (such as a sandblasting gun), fine crushed gravel can be mixed in to achieve a sprayed concrete of any type, including Portland cement. Phosphate cements can also be sprayed through traditional paint spray guns, shotcreting equipment or all sizes of sand blasting equipment, including hand held equipment, with the additions of appropriate retarding and/or lubricating admixtures, as detailed hereinbelow.

The cement compositions may be tailored to the desired end use. For example, it is possible to activate the silica sources by treating them with about 2–50% NaOH or KOH or MgOH solution, or with a solution of about 2–50% phosphoric acid to increase their reactivity. Likewise, it is possible to use potassium and/or sodium silicate, in either liquid or powder form, to replace or supplement some of the other silica sources and to fill in pores and increase hardness. Likewise, liquid Na or K silicates, or mixtures thereof, may be added as adhesion enhancers and accelerants, as well as contributing to "self-healing" and smoothness.

Replacing high calcined MgO with low calcined dolomite, MgO or CaO as the base increases coating strength and reactivity. Alternately, a mixture of calcined MgO and dolomite may be used with liquid phosphoric acid or phosphate salts as the cement precursors, with total acid and base combined concentrations ranging from about 5%–60% of the total cement mixture, more preferably about 20%. Decreased acid-base concentrations mean increased water concentrations, which yields better "wetting" and slower drying, giving the acid more time to react completely with as much base as possible, resulting in an enhanced hardness with time. Using sawdust, guar, Berylex™, cmc's, or cellulosic fibers increases the amount of water inside the matrix, yielding a slower and longer and more complete reaction which typically results in harder and/or less porous materials.

It is also possible to partially or completely replace MgO with natural wood ashes, such as wood potash, as the base component. The use of wood ash resulted in a smooth cement finish and a very hard coating. The reaction rate is slowed by replacing part or all of the MgO with slower reacting bases such as dead-burned MgO or with ZnO, $TiO_2$, Al2O3, Fe2O3, TiO2, zirconium silicates, zirconium floc, cubic zirconium, zirconium oxides, monoclinic zirconia (available from Carpenter Engineering, Inc. of Bow, N.H.), barium sulphate, ZrOH or Fe3O4.

Adding adhesive admixtures or mixtures of mono sodium phosphate (MSP) and aluminum phosphate yields a cement having enhanced adhesion, as docs the addition of chlorinated polyolefin, other adhesion enhancing polymers, resins, glues, adhesives and polymers such as moisture-cured polyurethanes. The advantages of increased adhesion include greatly reduced rebound upon spraying and less running and dripping on vertical walls and/or ceilings. These adhesive phosphate cements make excellent mortars. For spraying overhead or vertical walls, more adhesiveness is desirable and MSP, or MSP and aluminum phosphate, colloidal silicas, K-silicate, Na-silicate, silica flour or polymers may be combined to admix to or to replace up to 20% of the primary phosphate component of the cement. The additions of fine aggregates, such as fly ash, silica fume, colloidal silica, and fumed into or in combination with finer particles of phosphate salts and the base oxide or oxides have been demonstrated to enhance the adhesion of phosphate cement to substrates (both chemically similar and dissimilar to the phosphate cement). Further, phosphate cement adhesion may be improved by pre-treating the substrate with one of the following: a solution of magnesium, calcium, potassium, and/or sodium hydroxide; a suspension of one or more oxides of magnesium, ammonia, potassium, sodium, and/or calcium; a suspension of one or more phosphates of magnesium, ammonia, potassium, sodium, and/or calcium. Moreover, phosphate cement adhesion may be enhanced through acid-etching the substrate, such as with sulfamic, sulfuric, muriatic or hydrochloric acids. Likewise, roughening the substrate may also enhance adhesion. Additionally, unlike surface charges may be imparted to the substrate and the phosphate cement coating to further enhance adhesion therebetween. These phosphate binders can bind/adhere to most materials including but not limited to: themselves, fabrics, cloth, wood, plaster, portland cements and concretes and mortars, gypsum cements and plasters, plaster holding materials such as lath and chicken wire, roofing materials, metal/plastic/natural fiber netting, meshes and screen, metals, fibers, steel, and all building materials and other materials having a minimum degree of surface texturing. Otherwise smooth materials may be textured through etching, abrasion, or the like. Phosphate coatings and cements are usually considered to be structural materials, and some novel uses include: filling up empty spaces in card boards or plastic shipping materials to add strength and fire/heat resistance; filling the interiors or coating wood or plastic or laminates such as vinyl windows with phosphate cements or concretes in order to greatly strengthen same; and adding fire and heat resistance and increasing insulation R values. For example, application of a phosphate cement coating and/or filling its interior may change a window from merely an inexpensive residential-use window to an expensive commercial window, while adding stability and fire resistance and increased R values, and allowing for larger windows to be made based on a plastic or wood frame.

The following admixtures, aggregates, have been found to improve or modify the properties of the phosphate cements, phosphate cements being acid-base reactive ceramic cements wherein the acid is phosphoric acid (either liquid or as a phosphate salt, usually an alkali-earth salt such as a phosphate of magnesium, calcium, sodium, aluminum, zinc, or the like or ammonia) along with a base that is usually calcined magnesium oxide, dolomite, calcium oxide or the like, although it can contain other aggregates, such as sand and/or stone. The characteristics of the resultant cementitious product, such as a coating, may be tailored through the use of one or more additives or other ingredients. For example, replacing some of the phosphoric acid/salt with nitric acid results in a modified binder system. Lithium, zirconium, and aluminum oxides are especially useful where the composite will be subject to high temperatures.

Hardness and the hardening rate of the phosphate cement coatings may be impacted by the addition of Ca, Na, or Mg fluorosilicates and/or hydroxides, multiple-phosphate salts, phosphoric acid, magnesium silicate, aluminum oxides, hard metals, cermets and ceramics, calcium fluoride, glass frit, zinc stearate, boric acid, borates such as sodium borate, zirconium hydroxide, silica dust, plastics, zirconium, iron, sodium tetraborate decahydrate and aluminum oxides. Likewise, hardness may be increased through the addition of Ca, K and/or Na ions from such sources as feldspars, carbonates, and hydroxides, barium sulfate, dolomite, calcined dolomite, sodium silicate, potassium silicate flake and/or potassium silicates, zirconium oxides and silicates, aggregates, phosphate salts, volcanic ash (such as Mt. St. Helens Ash), mono magnesium phosphate (MMP), mono calcium phosphate (MCP), Gibberellic acid, Rockcast™ polymer (from the Victor Co. of Des Plaines, Ill.), and a novel use of colostrum as a very strong dispersant and sequestrant. Using coal tar shampoo as a water reducer, smoothing agent, and accelerator is novel. One preferred cement composition exhibiting excellent hardness is a composition containing ammonium phosphate cement (APC) as an inexpensive base to which aqueous colostrum and mono-magnesium phosphate have been added.

The addition of K, Ca, Zn, Zr cations or di-ammonium phosphate or colostrum or a defoamer or sodium or potassium silicates to ammonium phosphate cements adds significant strength, eliminates off-gassing of ammonium and eliminates pin holes and pock marks, leaving a smoother stronger composite at very little additional expense, whereas Mg, Ca, Zn, and K phosphates are very expensive. The replacement of magnesium phosphate or ammonium phosphate with phosphates of calcium or potassium, or using them along with Mg, K, Ca, Na, or Zn phosphates and sufficient water allows cementitious reactions to progress even after the cement sets up, i.e. the cement increases in hardness with time so long as there is internal moisture to drive the reaction with the unreacted acid salts and the base(s). This also provides some "self-healing" properties. Alternatively, hard materials such as silicon carbide, boron nitride, aluminum oxide, silicon nitride, hard technical ceramics or cermets, hard metals, aluminum nitride, stabilized ZrO and $ZrO_2$, diamond, ammonium meta-vanadate, vanadium oxides, tungsten carbide, molybdenum metal and/or oxide, and the like may be added into the mix to provide an additional composite or quasi-composite phase. Ultrafine particles of fly ash, silicon boride, silicon carbide, boron carbide, aluminum nitride, aluminum oxide and hard metals in the cement matrix also have the effect of increasing the hardness of the resultant cement body or coating. These particles are preferably spherical and may also be pretreated with KOH or NaOH (or nitric, phosphoric or hydrochloric acids or combinations of these acids) to increase their effectiveness.

Other additives that increase the hardness of the phosphate cement compositions include: oxides of aluminum, manganese, molybdenum, nickel, chromium and vanadium, aluminum paste, zinc-aluminum paste, tin, silica flour, colostrum, steel, iron ore concentrate or iron oxides alone or in combination with aluminum. Hardness is increased in phosphate cements by adding in one or more of the following: potassium silicates (preferably as powder, liquid or flake); sodium silicate (preferably as powder, liquid or beads); potassium feldspar; calcium feldspar, sodium feldspar, third generation super plasticizers; phosphate salts; fly ash; metal oxides; fine sized aggregate (including fly ash, phosphate salt particles, and oxide particles); citric acid; wood ash or potash; MCP; MKP, and polyphosphates of potassium and/or calcium (such as di-calcium phosphate or tri-calcium phosphate); nepheline seyenite; zirconium hydroxide, zirconium oxide and/or zirconium silicate; calcium hydroxide and/or calcium oxide; fine particles of pre-cured phosphate cement; silica fume; magnesium aluminum silicate dispersant; sodium fluorosilicate; mono-potassium phosphate; MetaMax™ (a Portland cement additive); about 1–20% of the total weight of phosphates to be replaced by mono-sodium phosphate; iron ore slag; grobbar, granulated blast furnace slag and/or iron oxides; small particles of mineral colorants; liquid glazes used internally in the mix, colloidal tin silica, trap rock from the iron mines; silica sand (preferably in multiple sizes to optimize PSD); potash; iron ore floc; ammonium perchlorate; sodium hypochlorite; metakaolin; MCP or MKP with Dequest 2000™ or Dequest 2006™; Surfonyl™ (available from Air Products Co. of Allentown, Pa.) surfactant; MCP anhydrous; MKP anhydrous; red iron oxide; particulate aluminum foil (especially when used with one or more of the following: NaOH or KOH and MKP or MCP and/or KCl or NaCl); magnesium aluminate; potassium perchlorate; silica flour; cmc's and cellulosic materials; zinc oxide; tin, very fine reactive fly ash (for example, Micron-3™ (available from Boral Technologies of San Antonio Tex.); dolomite (either calcined or uncalcined); BPO catalysts; sodium methyl silicates; titanium dioxide; Wollastonite (calcium silicate); fumed or colloidal silicas, stabilized colloidal silicas, and/or silica flour; and cordierite. Feldspar, and especially potassium and 0–9 micron sized lignite flyashes, are excellent for filling pores in Portland cement, as they generally have advantageous PSD's for filling Portland cement pores.

Hard, smooth reactive cements are made by combining phosphate cement with silica fume, fumed silica, perlite, colloidal silica, sodium silicate, potassium silicate, one or more feldspars (such as K-feldspar), MCP and/or MKP anhydrous, small and preferably spherical seeds of phosphate cements including that of magnesium and calcium phosphate cements, lignite and other flyashes under 10 microns in size, air entrainer, steel and/or plastic fibers and/or carbon fibers of two or more diameters and lengths, and micron or nanoparticles sized aggregates. Portland cement can be used in lieu of a phosphate binder for these reactive cements.

OPC is also hardened by feldspars, colostrom, small spheroidal seeds of OPC or phosphate cements, latest generation super plasticizers, and Na and K silicates. Also, solvents and/or other fuels (i.e., distilled petroleum products or the like) or explosive materials such as kerosene, ammonium nitrate, ammonium chlorate, strong oxidizers, hydrogen peroxide, nitro cellulose, alcohols, methane, dried corn, gasoline, diesel fuel, lacquer thinner and hair sprays such as Aquanet™ (manufactured by Cheesebrough Ponds USA Co., Greenwhich, Conn.), Japan thinner, and/or urea, when added to the slurry or spread on the hardened or not yet hardened cements of above compositions can be ignited to rapidly cure and density the composites. These composites can be made in-situ, resulting in very inexpensive and hard net-shape products. Cmc's, sawdust or paper may be soaked with the fuel and placed on the periphery of the material to be fired or placed in layers within the material to be fired to more evenly heat the in-situ composite. For sprayed coatings, fuel may be mixed into the slurry (either with or without an emulsifier) before firing. Alternately, the fuel may be sprayed, brushed or otherwise topically applied to the substrate before applying the slurry, and the applied cementitious material then sprayed with a top coating of fuel before igniting same. Still alternately, fuel may be topically applied on top of the cementitious coating and ignited as the cement approaches or exceeds its initial set. These cements and their composites may also be fired in a furnace. Ceramic fluxes such as feldspars may be used in these firings. These phosphate cements can be added integrally to ordinary Portland cement materials. Also, a thermite reaction of iron oxide and powdered aluminum can be mixed into the phosphate cements or mixed into other metal or ceramic materials and lit with magnesium ribbon or another high temperature ignition source to create flash fired reaction parts in-situ or as a hardened coating. By using the thermite ingredients, the need for placing the precursors in a slurry is obviated, as the temperature approaches 4000 degrees Fahrenheit and so the composite is a melt. Parts can be made in molds or by ramming or shooting them through an extrusion die, via a hydraulic ram, compressed air gun, or a spud gun.

The process of spraying concrete may also act to increase its density. The density of sprayed phosphate cements may also be influenced by such factors as particle size and shape, the particle size distribution, or PSD, of the component materials, temperature of the mix and surfaces, the oxygen content in the water, the purity of the water, the reactivity of the mix, and the amount of air mixed into the spray jet.

The use of chemical retarders to regulate the reaction rate is important The use of retarders, along with maintaining smaller particle sizes of the components and maintaining a low temperature cement system, is important in making cements sprayable. However, smaller particle size means more surface area and faster reaction, setting and hardening. Reaction rate may therefore be controlled through variations of the PSDs of the precursors. Further, precise temperature control is not always feasible, especially regarding large scale construction projects and applications subject to temperature extremes, such as from the weather. Thus, the use of retarders, alone or with particle size reduction and/or temperature control, is the preferred means of controlling the reaction rate of the phosphate cement coatings. Accelerators are useful in flash-firing the phosphate binder materials, and also for road patching and road and roof coating and all types of coating in cold weather, including the interior and exterior walls of commercial cold storage buildings; the present material can be sprayed down to 20 degrees Fahrenheit.

The following as retarders have proven effective in the control/slowing of the reaction rate of phosphate cements: citric acid, acetic acid, boric acid, Borax™, zinc stearate, fine rice husk ash (RHA), Berylex™, guar, Zr oxides, Zr silicate, deionized water, distilled water, oxygenated water, water containing water reducers prior to being introduced into the mix, polycarboxylic acid or salt therefrom, hydroxycarboxylic acid or salt therefrom, polyphosphonic acids or salts therefrom, superplasticizers, water reducers, TSP, calcium citrate, colostrum, calcium fluoride, sodium fluoride, soy emulsifiers, pyrophosphates, distilled water, deionized water, alkali metal borates, sodium silicofluoride, sodium and potassium carbonates, sodium nitrates and nitrites, Dequest 2000™ and Dequest 2006™ (available from the Solutia Company), potassium nitrates and nitrites, water swelling clays, Laponite™, EZ Spread™, Castmate™ (a Dow Chemical Co. trademark manufactured by H.C. Spinks Clay Co. of Paris, Tenn.), diatomaceous earth and/or betonite (or other water retaining clays which can be calcined), sodium carboxy-methycellulose (CMC), other CMC's, ethyl celluloses, Culminol™, Nexton™, ethyl methyl celluloses, ethyl hydroxyethyl celluloses, saw dust, cellulose, phosphonates and mixtures thereof EZ Spread™ is air entrained and it retards set and adds workability, freeze-thaw protection, elasticity and increases pot life, work time and board life as does Easy-Spred™. Other effective retarding agents include: relatively high pH phosphate salts (i.e., those having higher pH values greater than mono-phosphate salts); smoothening agents (as listed herein); potassium feldspar, Na or Ca feldspars, potassium silicates, potassium hydroxide and/or potassium phosphate; Berylex™; iron oxides, ground blast furnace slag, aluminum oxide, and acetic, citric and boric acids.

The use of a dispersant offers increased reaction rate control of phosphate cements, and is often used in much higher quantities than with Portland cement to achieve the same level of control. During spraying, retarders and sequestrants are particularly important, since physical intermixture of the cement precursors (the acid and the base components) that occurs during mixing and physical spraying drives the curing reaction even faster, causing heat buildup in the spraying equipment, further driving the reaction. These sprayed phosphate cements are excellent overcoats/topcoats for Portland cement concrete and asphalt, and they often eliminate the need for re-paving using the previous gravel and pavement in place as the best possible, already compacted mechanically and by freeze-thaw, road base. In addition, these phosphate sprays, cements and concretes can be used as a structural adhesive between layers of Portland. This allows a Portland cement slab (such as a roof portion) to be coated with a Portland cement such that the Portland cement coating bonds well to the pre-existing Portland slab through an intermediary phosphate cement layer. In other words, the phosphate cement layer is the adhesive middle layer in a Portland cement "sandwich". Phosphate cements react chemically with the unreacted calcium oxides and hydroxides and silicas in the Portland cement layers, creating a very strong bond for laminating the same or even dissimilar materials together. This phenomenon likewise allows road patching on Portland cement and asphalt roads with new Portland cement or asphalt by merely by spraying or placing a coating of phosphate cement between the old pavement and the new Portland cement/asphalt overcoat. Also, a thin coat over freshly poured Portland cement concrete (preferably applied as soon as the bleed water is gone) eliminates the need for curing compounds and speeds initial set while keeping the Portland cement moist for a longer time, thereby producing stronger Portland cement concrete with fewer cracks and a harder less porous surface with less heat shrinkage. It also protects the poured Portland cement from rain and wind. Winds tend to dry out Portland cements too quickly causing, heat shrinkage and spalling and decreased strengths. Road markings and colors and art work can be brushed or rolled or sprayed onto Portland cement, asphalt or phosphate cements/concretes or pavements.

Alternately, reaction rate may be controlled by using a less active base, such as zinc oxide, zirconium oxide, zirconium silicate, high bum calcined magnesium oxide, iron oxide, or titanium oxide to slow down the reaction and yield more pot life. Likewise, a less reactive phosphate salt (such as phosphates of potassium or zinc) may be used to control the reaction rate.

Another means of reaction rate control to increase pot life is to use larger particle sizes for the cement precursors and additives. Larger particles decrease the effective surface area for a given volume or mass of reactants, thereby slowing the reaction rate. Further means of slowing/controlling the cementitious reaction include using slower acting phosphate salts of Zn or K in addition to or in replacement of the above-mentioned salts and using distilled, substitution of some of the phosphate ion source with phosphoric acid, de-ionized and oxygenated water instead of standard tap water. Alternately, additions of Berylex™, guar, Easy-Spred™ (manufactured by the American Colloid Company of Mt. Prospect Ill.), clays, colostrum or cellulose or combinations thereof may be used to slow the cementitious reaction. Additionally, it should be remembered that by keeping the acid and the base components separated, pot life is increased.

Using the above described retarders and retardation techniques, phosphate cement slurries may be produced that can be sprayed, troweled, dipped, brushed, flowed, vibrated, stirred or otherwise placed; the slurries so produced tend to be self-leveling and can be self-filled into forms.

Conversely, it is sometimes desirable to accelerate the curing of the cement coating. This may be accomplished by using accelerants. Some accelerants include additions of a stronger acid, or by adding more or more highly concentrated acid, nitric acid, salt solutions such as sodium chloride or calcium chloride, more and/or smaller seed crystals, aluminum, tin, tin oxide, faster reacting oxides, calcium and/or sodium carbonates, yeast, carbonated water, and/or heated water to the cement components or admixture. Other accelerators include Mt. St. Helens fly ash; Micron-3™; volcanic ash; low or uncalcined oxides of magnesium, sodium, and/or calcium; wollastonite; ammonium metavanadate; and relatively low pH phosphate salts. It should be noted that in the case of solid accelerants, the effectiveness of the accelerant increases with its surface area to volume ratio. Additionally, warming the target substrate surface will likewise accelerate the cementitious reactions. Other accelerator additives include MgOH, NaOH, CaO, CaOH, $AlOH_3$, uncalcined MgO or dolomite, and/or KOH additives. Hydrogen peroxide, and/or sodium permanganate also speed set and hardening, as does metallic tin, polyelectrolytes such as NaCL, chlorine, Na hypochlorite, and Cascade™.

The sprayable cement components may be made less abrasive, so as to extend the life of the sprayer equipment, by using silica flour, silica fume, perlite, class F and C fly ashes, fumed silica and/or colloidal silica instead of coarser sand particles and rock as aggregates. Additions of diatomaceous earth and/or bentonite clay (or the like), in addition to smoothing the surface finish, also act as excellent retarders and sequestrant and improve the flowability of the phosphate cement slurry and assist in self-leveling and self-consolidation. Additions of zinc stearate also enhance self-leveling and self-filling properties. Additions of cmc's, buffers, fumed silica, colloidal silica also improve the finish as to defoamers and air entrainers and black iron oxide, feldspars, liquid glazes, K and Na silicates (especially in liquid form), nepheline seyenite, methyl methacrylate, silicate coatings, wollastonite in powder form, potash, KOH, NaOH, resins, Bermocoll™, multiple sizes of phosphates and two or more phosphates such as MCP, di- and tricalcium phosphates, KCl, and the like. Powdered coating materials, both resins and metals, can be used on and within the phosphate cements, as they can take the heat required to fuse the colors and many metals and to enhance their adhesion to the substrate. These phosphate ceramic cements are great insulators against very high heat and fire and may be used as refractories.

The appearance of the phosphate cement spray coating may be aesthetically improved by using colorants and/or less abrasive additive materials (see above). Patterns, both of different colors and of different textures and combinations thereof, may be introduced through additives. For example, a faux marble and/or faux granite look may be created by the introduction of excess MgO and colorants that do not disperse evenly, for example aquamarine blue and others that are not wholly water soluble. This makes beautiful randomly shaped swirls. Scattering colorants on the coating while it is still wet is also possible. The final finish is as variable as an artist's canvas. Wood potash, NaOH, feldspars, KOH, MMA (methyl methacrylate), EMA (ethyl methacrylate) and other plastics as additives yield a smoother finish, while the additions of EMA and MMA and some moisture-cured polyurethanes also yield a harder finish and often close pores. Additions of milder organic acids such as vinegar and oxalic acid yield smooth finishes. Colloidal silica, fumed silica, perlite, amorphous silica, sodium silicate, potassium silicate, small sized class F fly ash, and silica fume additives all yield smoother finishes and coatings having less open porosity, providing increased water resistance and better encapsulation of cements, mortars, and concretes. The addition of boric acid, as in ceramic pottery, feldspars, iron oxide can create a glaze when fired. Sodium silicate in sprays or on the surfaces of cements or concretes or mortars can create a glaze without firing, especially if it is repeatedly wet down. The additions of plastics (polymers, elastomers, resins and the like) typically yield nonporous cements having enhanced flexibility and improved fracture, compressive, and tensile strengths. Asphalt, Renolith™, Elvaloy™, ethylene terpolymer, ketone ethylene ester, tin, and polymer additives such as BMA and EMA and elastomeric coatings also may be added to Portland cement, yielding similar results; the Portland cement may be poured or sprayed. The addition of the above-listed plastic and/or elastomeric materials, such as Elvaloy™ or rubber particles, into a phosphate ceramic coating enables these strong cements to be sprayed onto materials such as asphalt, roofing, pavements, and the like that experience compression. Phosphate cement coatings containing such elastomeric and/or plastic additions are less susceptible to the damaging effects of thermal cycling (repeated stressing of the material due to differential thermal expansion of the coating and substrate), UV rays, freeze-thaw cycles and accordingly extend the life of the coated substrate. In other words, the elastomeric and/or plastic particles distributed throughout the phosphate cement matrix act to absorb some of the compressive and/or tensile forces acting on the cement due to the presence of heavy loads thereon or thermal cycling, thereby reducing the incidence of crack formation and propagation and of material creep. It should be noted that some of these additions, such as Elvaloy™, require an energy influx in order to initiate polymerization or "setting up"; this energy influx is partially satisfied by the exothermic heat of curing of the phosphate cement.

Powder spraying is accomplished on phosphate cement parts and surfaces via electrically grounding the cement by spraying it with a solution of an electrolyte such as NaCl or KCl in water and placing a conductive metal on the wetted surface to electrically connect the same to a ground potential and then spraying it with ionized power coatings from a negatively charged electrostatic gun. The fusing heat of 275–400 degrees Fahrenheit for ten minutes is thereafter applied to fuse, smooth and harden the coatings. Powder coatings are made by various manufacturers and arc typically polyurethane, polyester, Triglycidyl isocyanurate and blocked polyisocyante materials. One such manufacturer is Morton International, Inc. of Chicago, Ill.

Ductile and elastic strengths are improved by using fibers, preferably graded and multiple types of fibers in the same mix. Strength may likewise be improved by inserting steel or plastic rebar, or filling pipes or mats with cement. Adding sodium and/or potassium silicates to phosphate or portland cements adds to these two strengths. Materials for pipes can be pvc, steel, iron, plastics or bamboo. By using the self-filing additives and smaller particles and no rock aggregates, in either portland or phosphate cements, mats can be used as fibrous rebar, wherein the cements infiltrate the mats for strength and the mats improve ductile strength. By using multiple gradient fibers of two or more types and two or more materials and using same up to 15% by volume of the portland or phosphate cements, ductility is increased.

Elastic, fracture, tensile and ductility are increased by adding in resins, especially non-deforming plastics, as denoted herein and also by making resins within the portland or phosphate concretes.

Silly Putty, Dilatant™ (available from Dow Corning of Adrian, Mich.), Slime, shock absorbing polyurethane such as Adzorb™ (available from the New Balance Shoe Company of Boston Mass.), Hytel™ (made by the DuPont Chemical of Wilmington, Del.), gels, fibers, polyurethanes, waterborne and solvent plastics, epoxies, moisture-cure resins and gums all contribute to toughness and elasticity. In addition, the formation of polymers within the composite, after the Portland or phosphate cements have been thoroughly wetted and mixed, keeps water and these elastic shock absorbing materials inside the composite in the pores and vacancies and allows for the crystals to grow for months or years afterwards, continuing to fill in spaces and pores, and to continue to grow and self-heal, especially in calcium phosphate cements and when using colostrum. Further, these shock absorbing materials act like water balloons to cushion the shock and to hydraulically spread any impact force evenly over a great surface area and therefore increase fracture strength. The use of nanophase particles produces a smoother finish. If the nanophase particles are of reactive material, such as silica fume, volcanic ash or reactive flyash, nanophase MgO and small micron flyashes, they act as catalysts in phosphate and/or Portland cement compositions.

In general, smoothness and a reduction or elimination of pockmarks, surface irregularities and pinholes in magnesium and ammonium phosphate cements is achieved via the addition of one or more of the following: fumed or colloidal silicas; stabilized colloidal silicas; silica flour; oxides generally less active than calcined MgO, such as, for example, $Fe_2O_3$ or $Fe_3O_4$; $Al_2O_3$; kaolins; smectites; hectorites; potassium phosphates; potassium oxide; potassium hydroxide; Zantac™; air entrainers, defoamers, nitro cellulose; cellulosic materials; Kelco™ and cmc's and other cellulosic materials (which also provides wash-out protection and facilitate self-leveling and self-filling/self-consolidating); and gradient sizes of phosphate salts, fly ashes and aggregates. Surface smoothness may also be enhanced by using phosphate salt additives of differing solubility rates. Surface smoothness may likewise be enhanced by using as polyphosphates (such as, for example, tetra-potassium phosphate, tri-calcium phosphate and di-calcium phosphate) and lower pH of bases and higher pH of phosphate solutions and more water when using liquid phosphoric acid. The smooth finish makes the phosphate cements with finer aggregates suitable for underlayment, which can be feathered and sets fast enough that a file setter can finish grout the tile within an hour and one-half of laying it. Such grouting substantially does not shrink, has excellent bonding strength and is extremely resistant to water damage. Such material is also usable for patching wood, concrete, tile and asphalt.

Defoamers and ceramic additives as well as the addition of potassium ions from such materials as: KOH, K feldspars and other feldspars, can be used to smooth out and eliminate the pinholes and gas bubbles in ammonium phosphate cement, enhancing the appearance and reducing the porosity of this phosphate cement.

Phosphate cements, glazed or unglazed, may be used on surfaces including, but not limited to, wood, metal, Portland cement concrete, drywall, Styrofoam™ insulation, plywood, Dry-Vit™ a replacement for stucco exterior, plaster, stucco, adobe, wood and asphalt shingles, shakes, tar paper, roofing materials, roof boards with or without chicken wire or other material to enhance adhesion, basement walls, Portland cement concrete and asphalt roads, plaster finishes, all types of flat and pitched roofs cement bricks and blocks, and ceramic bricks and it adheres to itself, even if the phosphate substrate or joint is cold. These phosphate cements react chemically with the unreacted CaOH and silicates, Portland cements, concretes, plasters and mortars. Adherence is enhanced by using small particles and more reactive particles, as well as electrostatic charging, magnetizing, sticky materials such as potassium and sodium silicates, less water, oppositely charged chemicals and chemical additives and polyelectrolytes, other admixtures and plastics.

Different aggregates added to the cement mix change the appearance, strengths, costs, rheology, and may also change the equipment requirements. For instance, hard materials such as glasses or metal oxides may be added to form a second phase in the cement, imparting increased hardness properties to the final product. Likewise, fibers, such as those of metal, carbon, Kevlar™ (by Dow Chemical of Wilmington Del.), graphite, glass, crushed or recycled glass, or plastic or combinations thereof and in single or multiple lengths, diameters, and shapes, and in multiple, preferably gradient sizes, may be added to the pour or the spray mixes to form a fiber-reinforced cement composite in quantities of up to 15%, yielding composite with enhanced, tensile and ductile properties, especially when two or more different types are used and are used in different sizes compatible with the aggregate and the ingredients to obtain optimum PSD, along with the latest generation of super plasticizer to form the most dense non-porous cements, mortars, coatings and concretes with great tensile, ductile and elastic strengths.

Using the two-stage method, additives such as guar, clay, bentonite, fine sawdust, corn starch and other starches, small wood chips/fibers, cellulosic material, CMC's methyl cellulose, ethyl methyl celluloses, ethyl hydroxyethyl celluloses, soy dispersant, tri-sodium phosphate, aluminum and sodium phosphates, and thickeners result in increased adhesion and/or increased cushioning and encapsulating and holding effects upon the aggregate and upon the sprayed cement as a whole, thereby reducing rebound. Kelco-Crete™ or other gums and cmc's are used along with water reducers help to prevent washout of cement fines and chemicals and fine aggregates in underwater construction projects.

The addition of water in an amount sufficient to substantially match the viscosity of the slurry to that of water-based acrylic paints or enamels increases the sprayability of the cement mixture and slows the reaction rate of the coating. The particles are maintained in suspension/emulsion/gel state via the acid-base reaction. Thickeners such as silica flour, cellulosic materials, methyl cellulose, sawdust, flocculents, corn starch, gums, wheat starch, powdered gelatin, guar, polyurethane and Berylex™ may be added to maintain a viscosity suitable for spray coating. Soy lecithin has been found to be an excellent wetting agent, dispersant and emulsifier. Other emulsifiers include high-wetting cellulose fiber, yielding high bulking for more air entraining and longer wetting time (the mush makes for a soft place to hold more cement and to cushion the silica/aggregate hitting the hard surface of application, hence preventing rebound), starch (wheat or corn) along with soy. One preferred source of soy is ADM (Archer Daniel Midland) Ross & Rowe Lecithins: R & R 551™ a Soy Lecithin. R & R 551 is a nonionic surfactant and is propylene glycol and acetone insoluble. R & R 551 is non-edible. R & R 551 is used as a wetting and suspending agent in water based paints, is highly dispersible, and works well in phosphate cements and in Portland cements. Another preferred emulsifier/wetting agent is ADM's Yelkin TS™. The above-listed ADM products also supply carbon (a good hydrophobe), as do wood potash, saw dust, organic resin, and carbon black. The use of an emulsifier enables the mixing of the phosphate binder or Portland cements and/or surfactants with non-aqueous plastic finishes, such as epoxies, urethanes and other solvent-based coatings, and elastomeric or hard plastics. These phosphate cements also act as a filler in plastic adding compressive strength and speeding set times, all while being inexpensive and allowing for the forming or injection of net shaped parts in-situ without the need for firing or machining. The strong acids and bases in the phosphate cements also polymerize or aid in the polymerization of carbons and carbon ingredients such as wood resins, especially pine resins and creosote from oak, thus adding to elastic strength and the filling of pores.

The toughness and/or resistance to facture may be increased through the additions of polymer powders or granules (i.e., rubber particles) to the cement precursors. Adding from about 1% to about 50% of elastic, shock-absorbing materials can significantly increase the shear, ductile, fracture, and tensile strength of the resulting cement composition, especially if the elastomeric material does not deform under the shock, for example non-deforming elastomeric plastics. This effect is not limited to phosphate cements, and can be used in Portland cements, although in bulk applications it must be recognized that the compressive strength and other cement bonding related properties may suffer as higher percentages of toughness additives are added. These disadvantages are partially mitigated by the thin-film nature of phosphate cement sprays, making the use of toughness increasing additives particularly attractive therein. Some toughness-enhancing additive compositions include, but are not limited to: polyvinyl acetate (PVA); a mixture of PVA and boric acid or sodium tetraborate (preferably about 2:1); a mixture of PVA and liquid starch (preferably about 1:1); a mixture of PVA and boric acid or sodium tetraborate; and ground hard rubber/rubber crumbs. Also, some commercial products, such as foams, the line of Rubinate™ di-isocyanate moisture-cure resins (available from the Huntsman Polyurethane Company of Auburn Hills, Mich.), and the New Balance company's ABZORB™ product which is a shock absorbing polyurethane elastomeric which absorbs the shock with little or no displacement/deformation to the shock absorbing materials. Archer Daniel Midland's R 551 soy emulsifier product and other emulsifiers have been found to assist in the distributing these elastomeric products (even the solvent based epoxies and urethanes), evenly throughout the cements. Phosphate cements which can encapsulate and/or chemically combine with heavy metals and even low level radioactive materials to render them inert, may similarly encapsulate or react with VOC's to likewise render the VOC's inert or at least encapsulated for the protection of humans and the environment. Adding Ductal™ to phosphate cements as an additive further increases ductility and fracture strength, closes pores, often retards curing, and adds smoothness to the surface. Adding phosphate cement binder (alkaline earth metal oxide or hydroxide along with one or more alkaline earth phosphate salts or ammonium phosphate salts) as additives accelerates the set and increases the adhesion of Portland cements and also of Ductal™.

Moreover, in addition to providing enhanced toughness and crack-resistance in the cured cementitious coatings, the additions of the toughness enhancing polymer particles also decrease rebound problems during spraying, enhancing the adhesion of the sprayed on phosphate cement coating to the target.

The magnetic properties of the phosphate cement may be tailored through the additions of such additives as iron filings, ferromagnetic iron oxides, conductive carbon black, magnets, and powdered magnetic and ferromagnetic materials. The introduction of magnetic materials into the phosphate cement forms may provide radio frequency shielding and/or allow the coatings to function as magnets and/or as antennas which may be included on or within a whole road or building foundation or sprayed surfaces thereon. The magnetic properties of the phosphate cement coating or of Portland cement may also be influenced by providing a metallic underscreen, such as through the placement of a copper or aluminum wire mesh screen underneath or within a phosphate cementitious coating, cement, mortar or concrete.

The electrical properties can be tailored or tuned via addition of magnetic/electrical ingredients as above and including but not limited to metallic powders and slurries containing: Cu, Al, Ag, Au, Fe, Sn, conductive carbon black, polyelectrolytes, wire screens, rebar or metal particles or wires made of electroconductive materials and/or metals and/or conductive organic chemicals.

Hardware

The present invention works in all types of commercial sprayers/guns, even such sprayers as automotive-industry spray guns made to spray thin solvent coatings such as lacquers, enamels and urethanes and also water based coatings such as acrylics. The only spray equipment now available is designed for "shotcreting" and is very large, expensive and inefficient. As much as 40% of the "shotcreted" material is lost to rebound, and the product can only be applied in very thick and rough surfaced layers. The off the shelf Sears Roebuck & Co. of Arlington Heights, Ill., hand held sand blasting gun works well also, as do top loading spray guns wherein the material containing container/can is located above the spraying orfice which requires much less air pressure to vacuum draw the material up to the spraying chamber/orfice.

Until now, it was not possible to spray cements using coating guns because the cement thickness and viscosity were too great, resulting in a clogging of the paint guns' needle valves and spray tips and internal flow piping. Moreover, the sand and abrasive oxides in the cement catastrophically abrades the needle valves and spray tips of traditional spraying equipment. Increasing the amount of retarders and sequestrants allows the spraying of fine aggregates such as fumed and/or colloidal silicas, silica flour, and precipitated silicas to make fine, thin and attractive spray coatings. If particularly abrasive materials are sprayed, the spray gun components (valves, tips, etc.) may have to be accordingly hardened.

The preferred sprayer for the above-described phosphate cements is the 3M BODY SHUTZ APPLICATOR GUN™, available form the 3M Corporation and sold as part no. 08997 from 3M's Adhesives, Coatings and Sealers Division/3M in St. Paul Minn. 55144. The 3M SHUTZ gun is made to coat auto rocker panels with "chip resistance" coatings. The gun has no spray tip and a large orifice and few moving parts to clog up or wear out. With large diameter flow, short flow length, no spray tip and no spray orifice, clogging or packing up of the gun is greatly reduced and when it does it can be easily flushed.

For fine spraying, any paint or automotive paint gun may be used with compositions containing sufficiently low amounts of abrasives. The silica sources for fine spray compositions are preferentially silica fume, fly ashes, sodium silicate, potassium silicate, and/or fumed silica, amorphous silica or colloidal silica as a replacement for the sand. This results in much less abrasion to the spray gun, less packing up and/or clogging of the gun, assists in eliminating rebound, and makes a fairly smooth surface. About 5–10% NaOH or KOH or sodium or potassium silicate or combinations thereof, may be added to the sodium or potassium silicate and mixed in prior to adding it to the mix for smoother spraying.

Other sprayers useful with the present invention include standard air pressure paint guns, HVLP guns, LPLV guns, airless guns, pump fed guns, pumps, sand blasting guns, shotcrete guns, gravity fed guns, electrostatic guns, undercoating guns, and suction type guns.

It should be noted that the phosphate cement slurry behaves thixotropically, and that the thixotropic character of the slurry may be modified and controlled through the use of thixotropic additives. Accordingly, the pot life of the slurry may be extended by stirring (either by hand or mechanically) or vibrating the slurry. Moreover, the spray gun used to apply the phosphate cement may be configured to agitate or to otherwise provide turbulence to the slurry contained therein to likewise extend its pot life, such as putting air or spurts of air, or angling and/or having an opening for the vacuum air or pressurized air in the "paint can" with a threaded or Archimedes screw interior, causing the air to become turbulent and providing ongoing and regulated mixing of the slurry.

Portland and phosphate cements and coatings are made self-leveling and self-filling/self-consolidating via additives as described above and including air entrainers, ethyl hydroxyethyl cellulose, cellulose ethers, cellulose, methyl hydroxyl propyl cellulose sometimes known as Culminol™, Bermocoll™, and starch. The effect of self-leveling may be enhanced through the addition of one or more of the following to phosphate cements: smoothening agents or additives (listed separately herein); multiple gradient sizes of one or more of the following: alkaline earth phosphate salts, fly ash, metal oxides and aggregates; substantially spherical aggregates and fly ashes; second, third and fourth generation water reducers; Sulfonyl™ (available from the Air Products Company of Allentown PA); Ductal™; guar; various natural and synthetic gums; Kelco-Crete™ (a self-consolidating and anti-washout underwater Portland cement additive); Sikament 100SC™ (an anti-washout Portland cement additive by Sika Corporation of Sweden); metal carboxylmethylcelluloses (cmc's); potash; barium sulphate, and cellulosic materials in general, included untreated and chemically treated cellulosic materials. Similarly, the property of self-consolidation may be enhanced through the addition of one or more of the following to phosphate cements: Sulfonyl™ surfactant; Dequest 2000 or 2006 sequestrants; multiple sizes/gradients of alkaline earth and/or ammonium phosphate salts; multiple sizes/gradients of fly ash or other aggregates; gums, colostrom; CMC's, multiple sizes/gradients of metal oxides and/or phosphate salts; wetting agents; air entrainers, and Kelco-Crete™.

Instant densification of a formed phosphate cement may be achieved through placing an exothermically reacting solvent (such as a petroleum fuel) on or within the curing phosphate cement and then igniting the exothermic reaction. Examples of exothermically reacting coating materials include alcohols, diesel fuel, gasoline (with and without an emulsifier) and explosives, such as powdered nitro cellulose or black powder or the like and liquid explosives such as powdered aluminum and ammonium nitrates and ammonium perchlorates suspended in diesel or other fuels. The phosphate cement hardens and densifies due to the heat of the exothermic reaction.

Applications

Figure 2:
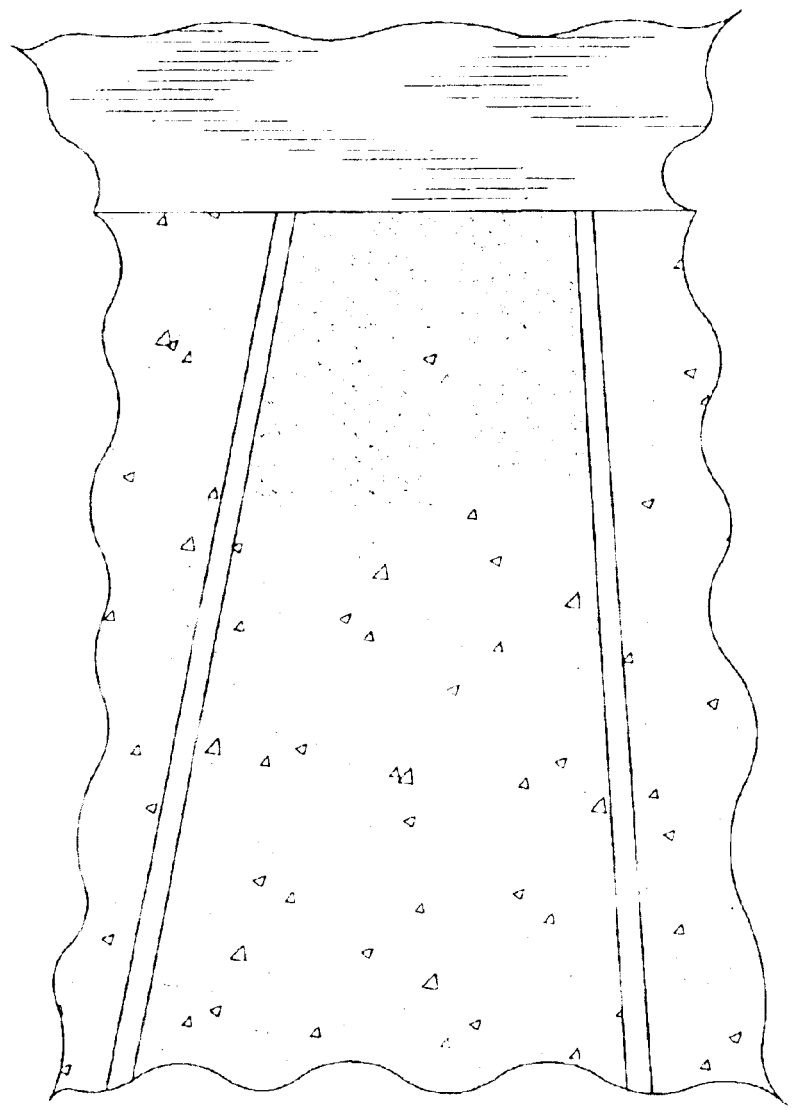
FIG. 2 is a first perspective view of four different phosphate cement spray coating on a concrete floor.
Figure 3:
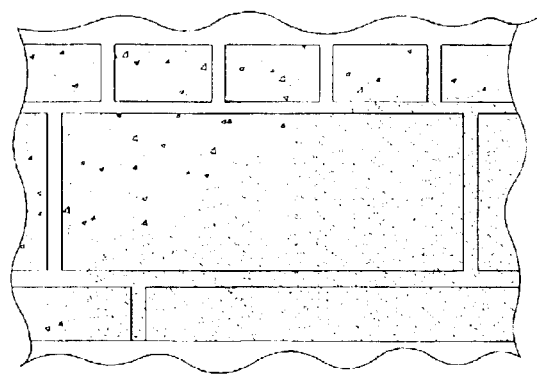
FIG. 3 is an enlarged perspective view of two of the phosphate coatings of FIG. 2.
Figure 4:
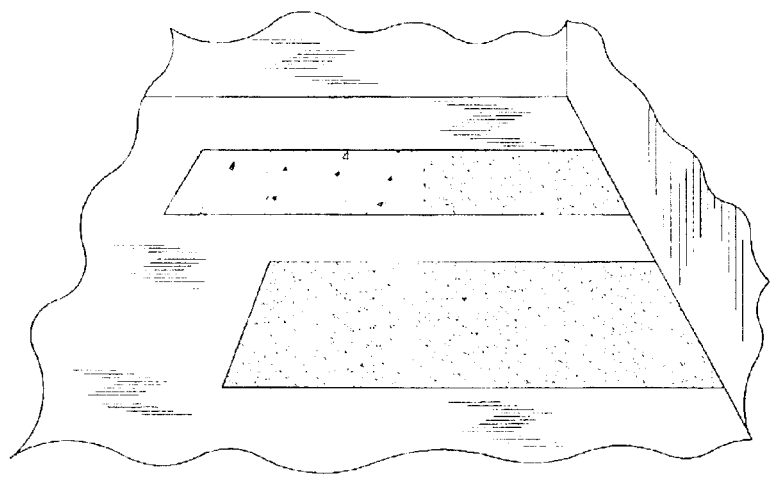
FIG. 4 is a perspective view of a sprayed-on phosphate cement coating partially covering a brick and mortar wall.

The following is a non-comprehensive discussion of some of the possible uses of phosphate cement coatings, both as sprayed and as otherwise applied. In addition to the traditional cement uses (blocks, slabs, and the like), the present invention may be used in the following applications:

Coatings—for floors and slabs (see FIGS. 1–3), overcoating roads, driveways, parking garage decks and ramps, bridge decks and sidewalks along with replacement of ceramic tiles, building walls (both inside and outside), drywall and plasters, plywood, siding, roof plywood, shingles both cedar shake and asphalt, coating asphalt and all concrete surfaces including replacing plasters and asphalt damp-proofing. The rougher the surface, having more surface area, the stronger the bond to the surface it is applied to. Coating properties such as flexibility and toughness may be modified through the additions of appropriate amounts of additives to minimize the effects of differential thermal expansion and/or the inherent flexibility of the coated member.

The present invention may be used for waterproofing and decoration. For example, basement walls may be coated to prevent water penetration and also to provide a quick finish if the spray has a white or other colorant component, thereby removing the requirement of framing and drywalling. Also, the exterior of houses and commercial buildings may be coated with phosphate cement in lieu of wood siding or brick or stone by putting up foam insulation and coating it with a rough coat ("scratch coat") of Portland cement plaster, gypsum plaster or phosphate cement, followed by a finish coat of phosphate cement or just one coat of phosphate cement.

Additionally, elements of the present invention may be combined with traditional paints to provide painted coatings having enhanced adhesion and wear properties. Additions of one or more of the herein named phosphate salts, either alone to react with the carbonates, oxides, some sulphates, nitrates, and/or titanates in the paint, or with oxides or other bases named herein such has lime, KOH or feldspar or silicates and other reactive minerals or substances such as iron or aluminum oxide colorants and fillers, zirconium oxides and silicates, in powder or liquid form, to traditional liquid paint compositions, produce a paint composition with enhanced adhesion, toughness, scuff resistance, water resistance, chemical stability, oxidation resistance, durability and an increase in overall lifetime. The addition of phosphate salts or hinders to paints cause a chemical reaction with oxide and/or carbonate components to yield an elastomeric ceramic coating that is chemically bonded to the substrate and/or to prior coatings of itself. The coating has the advantage of remaining breathable while enjoying increased flexibility, thermal cycling and creep resistance, and toughness. Optionally, additional silica and/or ceramic fillers or aggregates such as flyashes may be added to even further enhance the durability of the coating. These phosphate binders when added to silicate coatings will strengthen them and make them sufficiently hard and waterproof to coat concrete floors (such as warehouse floors), bridges and parking decks.

Adding the binder with or without flyash or other silica sources greatly improves many coatings including paints, especially exterior coatings such as Duration™ (made by Sherwin Williams-Company of Cleveland Ohio). Coatings or paints containing one or more of the following react with phosphate or phosphate binder or phosphate binders with silica additives: oxides of Ca, Mg, Zn, Ti, K, Zr, Co, Al, Ni, MO, Cr or V; silicas (such as silica sand, silica flour, colloidal silicas, silicates of alkaline earth metals and iron, zirconium, sodium and potassium, micas, nepheline seyenite, magnesium-aluminum silicate, aluminum silicates and talc), hydroxides of Ca, Mg, Zn, Ti, K, Na, Zr, Co, Ni, Al, Ni and Cr. Carbonates of Ca, Mg, Co, Ba, Li and K; barium titanate; some polymers; acids (such as boric, tartric, acetic, citric or oxalic); and nitrates of Na, K, and Ca. The phosphate binder adds heat resistance, compressive strength, durability, scuff protection, hardness, shear strength, UV resistance, and heat and electrical insulation and increases adhesion and wear life. The phosphate-containing additives can be in the form of a dry powder mix in a packet ready for the user to merely toss in when the paint is mixed. Alternately, the additives may be mixed in to each roller tray or pre-mixed with the paint in the can (including liquid and spray paints). The phosphate binders can be added to clay pottery slurries to make rapidly curing greenware. In this way, finished ceramic pieces from pottery to tool bits can be made in very short times without the need for firing.

When air entrainers are added, the coatings become even better electrical and heat insulators, which saves on fuel bills. Adding the binder with or without flyash or other silica sources greatly improves silicate coatings which are beautiful mineral coatings based on potassium and/or sodium silicates but which are not very hard nor are they water resistant enough to be used for outdoor floors, indoor floors, roofs, pavements or other wet or harsh applications.

Roofing—the present invention can be sprayed right over the plywood or other roof "decking" as it is fireproof and water proof and can be made any desired color (or put on two-toned). This entirely eliminates the need for: shingles, cedar shakes, roof tiles, metal roofs, siding, exterior or interior painting, and the like. Holding strips, wire, or mesh may be tacked to the roof surface to provide a textured substrate for the sprayed cement, allowing enhanced adhesion. A plastic pattern or form may be used with the cement spray to modify the appearance of the cement coating to produce an illusion of slate, wood shakes, or tile. A plastic pattern can be used, just as is now used to for over coating concrete with Portland cements or concretes (which have no reactive adherence and often have thermal cycling problems), to make the "covered over area" which prevents the coating from touching the concrete surface, look like "mortar joints" between the faux paving brick, cobblestone or slate appearing concrete surfaces. A brown or reddish brown colorant provides an attractive way to waterproof aged cedar shake roofs, eliminating the need for expensive re-roofing. Old cedar shakes provide the irregular pattern and depth and thus the classic look is not lost. Cedar shake roofs and expensive and slate roof tiles and clay roof tiles are very expensive. Cement roof tiles are expensive and heavy and the cement, cedar and slate all require much skilled labor. Phosphate cements and thin reactive cements where the cement binder is Portland or aluminum can make good roof tiles or slates if the aggregate is small and preferably light in weight. These cement coatings make great overlays for pavements, driveways and sidewalks and make excellent roof coatings, preferably in a warm climate where the ceramic coatings with air entrainers and surface or integrally colored with white mineral colorants/oxides or photochromic materials to keep the buildings much cooler. Such ceramic roof coatings have the advantage of substantially longer life than their traditional counterparts and are immune to damage from ultraviolet light. For walls, the present invention phosphate cement coatings may be made to resemble marble also and can be finished coated with paints or even harlequin coatings. All these phosphate cements can be machined and polished. Both interior and exterior walls may benefit from cement spray coating which leaves a hard impervious smooth or textured insulated ceramic very long life coating. Shingle, tar, asphalt, tar paper, wood, plywood or sheathing board roof materials can be spray coated with phosphate cement to eliminate tearoffs and the need for replacement roofing. Reflective or absorbing pigments (such as white or black pigments) may be added to decrease or increase the heat absorbing properties of the coating to saves on energy bills (depending upon the ambient environment); likewise, the coatings may be formulated to be air entraining to further enhance their thermal insulating properties.

This phosphate cement spray-coating works well for mortaring bricks and adhering the layers of laminate materials. Phosphate cements especially with elastomeric ingredients and small particles make excellent adhesives for laminates, the elastomeric ingredients allow enhanced toughness, analogous to the thin layer protein layer in between the brittle calcium carbonate layers of a conch shell or the glue layer between the wood/fiber layers of plywood. Fibers in the phosphate cements also contribute to ductility and elastic strength, especially if they are oriented or aligned for maximum strength and especially if they are steel or aluminum or high strength carbon fibers or fiberglass. The spray coating also works well to cover asbestos or silica dust-containing insulation to encapsulate the asbestos or silica dust, and even chemically bond the dust into the cement matrix.

Prefabricated or temporary structures may be produced by spray coating insulation foam blocks and/or forms in situ with a phosphate cement coating. The cement adds strength, durability, waterproofing, fireproofing, and thermal insulation (air entrainment) to a structure. The cement coating also acts as an adhesive to hold the structure together, eliminating the need for conventional fasteners.

Sprayed phosphate cement coatings can also be used to reinforce and waterproof drywall, wood and plywood and tar paper and roofing membranes, which are susceptible to water damage and has little structural strength of its own and must be painted even for interior use. Also, the hard coating strengthens and adds life to drywall which otherwise is easily penetrated.

Tuckpointing—phosphate mortars and cements strongly adhere to old mortar in the joint and to adjoining brick or cement blocks, and can be sprayed or squeezed into the joint. Portland cement mortars suffer from the disadvantage of having to be slowly applied into the joint from a small palette or mortar board with a small, thin trowel, a process that is time consuming and labor intensive. The porous highly air entrained Portland cement mortar is the weakest and most porous part of a brick wall. The phosphate cement slurries of the present invention are faster and easier to use, stronger, tougher, less labor intensive and less porous than ordinary Portland cements.

Exhaust and heat shielding—Dipping and/or spraying a thin coating of phosphate cement on the interior or exterior of exhaust pipes, engine parts, space travel vehicles, aircraft shells, rocket coatings, mufflers, catalytic converters, exhauster headers and manifolds, yields a ceramic coating on the inside, the outside, or both. The coating protects the metal from chemical attack as well provides thermal insulation. Phosphate coatings can also provide ceramic protection of furnaces, heat ducts and other heat generating and heat carrying equipment. Phosphate cement coatings may also provide the fire protection of building materials, including structural steel.

Environment—coating heavy metals, walls of sewer and septic systems, interior and exteriors of man holes, pre-coating concrete pipe so it is more water proof and resistant to corrosive chemical (acid and alkali) environments. Concrete water pipe that is not waterproofed loses an astoundingly high percentage of water, as it is very porous. Phosphate cement may also be sprayed or otherwise coated onto asbestos-containing structural members to encapsulate the asbestos and reduce or prevent the incidence of exposure, thereby creating artificial reef homes for fish and marine wildlife.

Pavement—the present invention can be used as a concrete, mortar, cement or coating and as a strong inert aggregate or as a filler material in other materials such as in plastics, other cements, and concretes. The phosphate cement of the present invention bonds to itself, concrete, and asphalt and can be aesthetically colored with oxides or other colorants. Adding a cement coating to asphalt provides the benefits of increasing the surface hardness, reducing surface cracking, decreasing water and chemical intrusion, decreasing rutting and buckling caused by softening asphalt in high temperatures, decreasing UV damage, and prevents "sweating" of tar and oil from the asphalt surface, increasing road life and decreasing skid risks. Light colorants could be added to reflect away light and decrease road temperature, thereby reducing thermal cycling and saving the tear out and re-paving of asphalt and Portland cement roads. Filling the cracks and spalling in concrete and asphalt pavements along with patching the pot holes and then coating the surface with the present invention can often avoid the need for tearing out the old concrete and re-paving the road, saving vast amounts of tax monies and environmental problems and dumping fees.

Curing concrete—spray phosphate cements on top of OPC (ordinary Portland cement concrete) when the bleed water disappears or is nearly dried up, and that holds curing water in the OPC, resulting a slower and more complete curing reaction and harder concrete. It also yields a harder and more chemically stable phosphate surface coating. The phosphate coating further resists road salt (calcium chloride) and water, protecting included rebar from rust. Further, spraying phosphoric acid on the top of the concrete reacts with free CaO and CaOH to make an in situ coating that penetrates and chemically binds to the Portland cement pavement or slab. The use of phosphate cements as curing agents and top coats/overcoats on Portland cements would greatly increase the current quantities of phosphate cements used today. The extra expense would be more than offset by the increased life of the coated pavement. The savings in re-paving roads and bridge and parking decks alone necessitated by infusion of NaCl road salt along would save untold dollars each year. Road salt gets into the Portland cement pores and rusts the rebar, which expands and breaks up the Portland cement concrete; a phosphate cement coating would substantially retard such salt intrusion while simultaneously reducing wear. Also as a curing enhancer for Portland cement a phosphate cement coating would prevent premature evaporation and elimination of the original water in the Portland cement understructure, causing the Portland cement to more completely react during curing and contributing to increased compression strength. Phosphate cements are attractive coatings for rebar (even rusty rebar) since they greatly reduce the ability of road salt and/or other chemicals to reach and react with the ferrous rebar. This greatly increases the life of Portland cement highways, parking and bridge decks. Likewise, coating the hulls of ships to protect them from rust, salt water, and barnacles making for less maintenance, less downtime, and possible slightly better speed through the water.

Rust resistance/conversion—phosphate cements convert the ferric rust (iron oxides) to inert iron phosphate silicates. Preferably, for rust conversion, Ca and K nitrates and/or nitrites are added to the cement. The encapsulating and non-porous and pH neutral (the pH can be easily tailored) features of this reactive cement can all contribute to preventing the rusting of steel reinforcement within the concrete. Dipping or spraying new or rusty iron rebar or structural steel members with these phosphate cement coatings (especially ones containing silica fume, fumed silica, and/or reactive clay), yields reinforcing members that are impervious to water and salt corrosion and chemical attack.

Artificial Reefs: Phosphate cements may be used to cement together concrete building units, such as cement blocks, to produce an artificial reef. Such a reef could be emplaced to attract and hold fish, prevent erosion, or shore up an eroding reef to prevent catastrophic change to an existing ecosystem. Moreover, wet phosphate cement can be applied to either the inside or outside of the blocks and then sprinkle and/or fertilizer and/or seeds of water plants onto the surface of the wet cement, thus creating an artificial reef with its own feed source and more ability to hide and to have microfood organisms and small food fish with which to attract the larger fish.

Preferred Mixing Process

The following steps describe one preferred mixing process:

a) add the retardants: wetting agents, superplasticizer, buffers, water reducers, defoamers, sequestrants or combinations of same to the water(preferably de-ionized or distilled water) which has been chilled or to which crushed ice or crushed dry ice has been added;

b) add the base(s); of calcined MgO or other alkali earth oxides or hydroxides by itself or with other bases such as Na or K to the water and mix dissolved; and c) add either the acid or acidic salt (potassium or other acidic phosphates or ammonium phosphates) to the water and mix it in until it dissolves.

It should be noted that by delaying the combination of the acid and the base as long as possible, all of the total mix time except step c is added onto the "pot life". When using plastic additives, the following steps are added to a, b, and c above:

d) after the acid is added per step (c) and thoroughly mixed in, add in desired plastic and mix; optionally, catalyst and/or polymer initiator and/or an emulsifier may be admixed at this time; or e) catalyst and/or polymer initiator is added last and mixed.

For Portland cement based mortars, cements and concretes and for gypsum and aluminum and blended cements, the mixing process is simplified. The retarders/sequestrants are added to the water first (although that is not necessary, they can be added to the dry cement) then water is added and the slurry mixed. Desired plastics or other additives are mixed in last.

Color may be added to any of these cementitious sprays, mortars or concrete at any time during the mix cycle, but with the phosphate cements colorants are preferentially added as dry mineral powders or liquid colorants after step (c) above.

For phosphate cements as premixed powders or for premixed powders with aggregate, perform step (a) and then add in the water and mix it.

Agglomeration is reduced if the acid is added in slowly to the mixer or hand mixed thereinto, thus lengthening pot life and yielding a smoother and stronger coating.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are to be desired to be protected.

What is claimed is:

1. A method of forming a phosphate cement coating, comprising the steps of:

a) dissolving a phosphate source in a volume of liquid paint;

b) applying a portion of the volume of liquid paint to a surface; and c) reacting the phosphate with anions present in the paint to form a dispersed phosphate cement phase in the paint;

wherein the phosphate source also includes silica; and wherein step a) includes applying a charged solution to the substrate.

2. The method of claim 1 further comprising before step b), precoating the substrate with an alkali coating.

3. A method of forming a phosphate cement coating on a substrate comprising the steps of:

a) precoating the substrate with an alkali coating;

b) dissolving a phosphate source in a volume of liquid paint;

c) applying a portion of the volume of liquid paint to a surface; and d) reacting the phosphate with anions present in the paint to form a dispersed phosphate cement phase in the paint;

wherein the phosphate cement slurry contains ferromagnteic particles; and wherein the alkali coating is an aqueous solution including at least one of the following in solution: NaOH, KOH, caustic soda, and soda ash.

4. A method for forming a phosphate cement coating on a surface, comprising the steps of:

a) providing a first cementitious constituent;

b) providing a second cementitious constituent adapted to combine with the first cementitious constituent to produce a phosphate cement coating;

c) spraying the surface with the first cementitious constituent;

d) spraying the surface with the second cementitious constituent; and e) reacting the first and second cementitious constituents to produce a phosphate cement coating;

wherein at least one cementitious constituent includes au accelerant.

5. The method of claim 4 wherein the first constituent is a phosphoric acid and the second constituent is a metallic base.

6. The method of claim 5 wherein the first constituent includes at least one of the following group: potassium phosphate, calcium phosphate, magnesium phosphate, sodium phosphate, aluminum phosphate, zinc phosphate; and wherein the second constituent includes at least one of the following group: magnesium oxide, magnesium hydroxide, calcium hydroxide, zirconium oxide, zirconium hydroxide, potassium hydroxide, sodium hydroxide, dolomite, zinc oxide, aluminum oxide, potash, calcium oxide, lithium carbonate, barium carbonate, molybdenum oxide, aluminum hydroxide, tin oxide, tin, nickel oxide, iron oxide, titanium oxide, or wood ash.

7. The method of claim 4 wherein the first constituent is a metallic base and the second constituent is a phosphoric acid.

8. The method of claim 7 wherein the first constituent includes at least one of the following group: magnesium oxide, calcium oxide, magnesium hydroxide, calcium hydroxide, zirconium oxide, zirconia hydroxide, potassium hydroxide, sodium hydroxide, dolomite, zinc oxide, aluminum oxide, iron oxide, titanium oxide, wood ash; and wherein the second constituent includes at least one of the following: potassium phosphate, magnesium phosphate, zinc phosphate, ammonium phosphate, sodium phosphate, calcium phosphate, iron phosphate.

9. The method of claim 4 further comprising the step of;

f) after step c) and before step d), adding at least one of the following to the first constituent: an accelerant, a reducer, a wetting agent, a buffer, an adhesive agent, an air entraining agent, a hardening agent, a toughening agent, or a smoothening agent.

10. The method of claim 9:

wherein the accelerant comprises at least one of the following: nitric acid, sodium chloride, calcium chloride, tin, tin oxide, calcium carbonate, potassium carbonate, carbonated water, hydrogen peroxide, potassium permanganate, sodium permanganate, sodium silicate, potassium silicate, sodium aluminate, aluminum hydroxide, fly ash, wollastonite, sodium hypochlorite, sodium chloride, potassium chloride, volcanic ash, distilled petroleum, and heated water;

wherein the adhesive agent comprises at least one of the following: sodium phosphate, fly ash, and aluminum phosphate;

wherein the hardening agent comprises at least one of the following: calcium fluorosilicate, sodium fluorosilicate, magnesium fluorosilicate, silicon carbide, boron nitride, tungsten carbide, molybdenum, molybdenum oxide, nickel oxide, chromium oxide, mullite, kyanite, alumina, ammonium meta-vanadate, ferrovanadium, vanadium oxide, aluminum, diamond, magnesium phosphate, sodium phosphate, zirconium, phosphate, colostrum, sodium silicate, potassium silicate, fly ash, zirconium hydroxide, zirconium oxide, zirconium silicate, zirconium stearate, silica fume, calcium silicate, titanium dioxide, cordierite, and aluminum phosphate;

wherein the smoothing agent comprises at least one of the following: fumed silica, colloidal silica, silica flour, $Fe_2O_3$, $Fe_3O_4$, kaolin, smectite, hectorite, potassium phosphate, potassium oxide, potassium hydroxide, and nitro cellulose, potassium peroxymonosulfate, sodium persulfate, sodium hypochlorite, Al2O3; and wherein the toughening agent comprises at least one of the following: polyvinyl acetate and ground hard rubber.

11. The method of claim 4, further comprising the step of:

g) after step c) and before step d) adding a polymer initiator to the first constituent.

12. The method of claim 11, further comprising the step of:

h) after step c) and before step d) adding a polymer initiator to the second constituent.

13. The method of claim 4 wherein the surface is heated.

14. The method of claim 4 wherein the surface is cooled.

15. The method of claim 4 wherein the steps d) and e) occur substantially simultaneously and wherein the first and second constituents intermix during spraying.

16. The method of claim 4 wherein at least one of the constituents is heated.

17. The method of claim 4 wherein at least one of the constituents is cooled.

18. The method of claim 4 further comprising the step:

adding a colorant to the first constituent.

19. A method for coating a substrate with a phosphate cement, comprising the steps of:
   aa) providing a first phosphoric acid liquid component;
   bb) providing a second metallic base liquid component adapted to reactively combine with the first phosphoric acid liquid component to produce a phosphate cement coating;
   cc) providing a cooling agent;
   dd) spraying the substrate with the first phosphoric acid liquid component;
   ee) spraying the substrate with the second metallic base liquid component;
   ff) spraying the substrate with the cooling agent;
   gg) mixing the first phosphoric acid liquid component, the second metallic base liquid component and the cooling agent to form a phosphate cement coating; and
   hh) curing the phosphate cement coating.

20. The method of claim 19 wherein the mixing of the first phosphoric acid liquid component, the second metallic base liquid component and the cooling agent occurs on the substrate.

21. The method of claim 19 wherein the mixing of the first phosphoric acid liquid component, the second metallic base liquid component and the cooling agent occurs during spraying.

22. The method of claim 19 wherein the mixing of the first phosphoric acid liquid component, the second metallic base liquid component and the cooling agent occurs in a liquid paint medium.

23. The method of claim 19 wherein the cooling agent comprises at least one of the following: ammonium nitrate, chilled water, and water ice.

24. The method of claim 19 wherein the substrate is a first layer of Portland cement and further including a second layer of Portland cement coating the phosphate cement coating.

25. A method of repairing cementitious surfaces, comprising the steps of:
   identifying a surface flaw;
   spraying the flaw with a phosphoric acid solution;
   spraying the flaw with a metallic base solution;
   mixing the phosphoric acid solution and the metallic base solution;
   reacting the phosphoric acid solution and metallic base solution to form a phosphate cement bonded to the cementitious surface; and
   accelerating the reaction of the phosphoric acid solution and metallic base solution.

26. The method of claim 25 wherein the phosphoric acid portion and the metallic base portion are intermixed prior to spraying.

27. The method of claim 25 wherein the phosphoric acid portion and the metallic base portion are sprayed onto the substrate and wherein the phosphoric acid portion and the metallic base portion are intermixed during spraying.

28. The method of claim 25 wherein the reaction is accelerated via the application of heat.

29. The method of claim 25 wherein the phosphoric acid portion and the metallic base portion are intermixed in a liquid paint.

30. The method of claim 25 wherein at least one of the phosphoric acid portion and the metallic base portion includes an accelerant.

31. The method of claim 30 wherein the accelerant comprises at least one of the following: nitric acid, sodium chloride, calcium chloride, tin, tin oxide, calcium carbonate, potassium carbonate, carbonated water, hydrogen peroxide, potassium permanganate, sodium permanganate, sodium silicate, potassium silicate, sodium aluminate, aluminum hydroxide, fly ash, wollastonite, sodium hypochlorite, sodium chloride, potassium chloride, volcanic ash, distilled petroleum, and heated water.

* * * * *